United States Patent [19]

Ogawa

[11] Patent Number: 5,568,164

[45] Date of Patent: Oct. 22, 1996

[54] CURSOR DISPLAY SYSTEM

[75] Inventor: Hironobu Ogawa, Kawasaki, Japan

[73] Assignee: Fujitsu Limited, Japan

[21] Appl. No.: 551,369

[22] Filed: Nov. 1, 1995

Related U.S. Application Data

[63] Continuation of Ser. No. 278,157, Jul. 21, 1994, abandoned.

[30] Foreign Application Priority Data

Dec. 21, 1993 [JP] Japan .................................. 5-321594

[51] Int. Cl.⁶ ........................................................ G09G 3/36
[52] U.S. Cl. ............................ 345/145; 345/126; 345/157
[58] Field of Search ................................... 345/126, 145, 345/157, 160, 161, 163, 167, 168; 341/23

[56] References Cited

U.S. PATENT DOCUMENTS 5,305,397  4/1994  Yamaguchi ............................. 345/126

FOREIGN PATENT DOCUMENTS

| 58-198088 | 11/1983 | Japan . |
| 2-101529 | 4/1990 | Japan . |
| 2-238518 | 9/1990 | Japan . |
| WO-A-9100586 | 1/1991 | WIPO . |

OTHER PUBLICATIONS

N. Leon, *Thumbwheel Positional Control Unit*, IBM Technical Disclosure Bulletin, vol. 21, No. 7, Dec. 1978, pp. 3024–3025.

Patent Abstracts of Japan, vol. 14, No. 498 (P–1124), Oct. 30, 1990 & JP–A–02 204 783 (Victor Co. of Japan Ltd.), Aug. 14, 1990.

Patent Abstracts of Japan, vol. 16, No. 371 (P–1399, Aug. 10, 1992 & JP–A–04 116 716 (Matsushita Electric Ind. Co. Ltd.), Apr. 17, 1992.

*Primary Examiner*—Richard Hjerpe
*Assistant Examiner*—Kent Chang
*Attorney, Agent, or Firm*—Staas & Halsey

[57] ABSTRACT

A cursor display system causes a cursor to move on a screen in the same direction as that of a pointing device, such as a mouse, operated by an operator viewing the screen, even if the display on the screen is inverted, i.e. turned round through 180 degrees. To display the cursor, which is moved by operating the pointing device, on a display device which is capable of inverting the display on the screen, a display status holding device is provided for memorizing whether the screen displayed on the display device is in a normal status or in the inverted status. The display status holding device is connected to a changeover device for changing data of operating directions supplied from the pointing device depending on the status memorized by the display status holding device. Further, a cursor position calculating device calculates a display position of the cursor to be displayed on the screen, based on data supplied via the changeover device from the pointing device to supply the display position to the display device.

3 Claims, 8 Drawing Sheets

| CURSOR MOVING OPERATION | COORDINATES OF CURSOR POSITION FOR DISPLAY [INITIAL VALUES = (x,y)] | |
|---|---|---|
| | NORMAL | INVERTED |
| ⇧ | (x, y−1) | (x, y+1) |
| ⇩ | (x, y+1) | (x, y−1) |
| ⇨ | (x+1, y) | (x−1, y) |
| ⇦ | (x−1, y) | (x+1, y) |

FIG. 3

CURSOR DISPLAY SYSTEM

This application is a continuation, of application Ser. No. 08/278,157, filed Jul. 21, 1994, now abandoned.

BACKGROUND OF THE INVENTION (1) Field of the Invention

This invention relates to a cursor display system, and more particularly to a cursor display system adapted to display a cursor on a screen in which a display is turned round through 180 degrees, in accordance with motion of a pointing device operated by an operator.

(2) Description of the Related Art

Conventionally, when some explanation is made for customers, presentation is mainly performed by way of documents. However, with progress of electronization of information, an electronic presentation is more extensively performed, in which the explanation is made while viewing a screen provided by a computer.

In the electronic presentation, a presenter or explainer operates the computer while viewing the screen. The same screen must be viewed by the customer. For example, when presentation is made to the customer face to face by the use of a notebook-sized personal computer having a display device formed in one unit with a body thereof, the operator operates the computer to cause a desired screen to be displayed thereon, and then the personal computer is turned round for the customer to view the display screen.

Further, there are types of computers adapted to permit the display device to be set horizontally for convenience of a face-to-face presentation. For example, there are computers whose display device and computer body including operator control elements can be opened flat, and computers having the display and the body already formed in one flat piece. Such constructions of the computer make it possible for both an operator and a customer to view the same display screen simultaneaously. Further, it is also possible to turn the display screen round through 180 degrees for the customer to view the contents of the display with ease, and as a result, operation and explanation can be made without moving the computer body.

On the other hand, recent application software more often uses a pointing device (coordinates-indicating device), such as a mouse, to point to a particular portion displayed on the screen or to command an execution of a program. However, the use of such a pointing device in the above-described situation of face-to-face presentation causes the following inconveniences in operating the computer:

The pointing device is constructed such that when the operator moves it forward away from him while viewing a screen in front of him, a cursor appearing on the screen moves upward, and when the operator moves it backward to him, the cursor moves downward on the screen. Similarly, when the pointing device is moved rightward or leftward, the cursor on the screen also moves rightward or leftward. Thus, the cursor appearing on the screen is moved in the same or analogous manner as the pointing device operated by the operator is moved. Therefore, in the face-to-face presentation, if the operator intends to use the pointing device after the display on the screen has been turned round through 180 degrees for the customer to properly view the contents of display, the operator views the screen from the wrong or inverted side. Accordingly, the cursor displayed on the screen also moves in an inverted manner which is opposite to a manner of movement of the pointing device intended for the analogous movement of the cursor as used by the operator. Therefore, the operability of the pointing device becomes very much degraded in such a case.

SUMMARY OF THE INVENTION

It is the object of the invention to provide a cursor display system which improves the operability of a pointing device, such as a mouse, when the pointing device is used with a display turned round through 180 degrees.

To attain the above object, the present invention provides a cursor display system for displaying a cursor on a display screen adapted to permit turning of a display on the display screen through 180 degrees. The cursor display system comprises display means having a function of turning the display on the display screen through 180 degrees, a pointing device to be operated for moving a cursor appearing on the display screen, display status holding means for memorizing whether the display of the display means is in a normal status or in an inverted status in which the display on the display screen is turned round through 180 degrees, changeover means for inverting data of operating directions of the pointing device depending on the normal status or the inverted status memorized in the display status holding means, and cursor position calculating means for calculating a display position of the cursor to be displayed on the display screen, based on data delivered from the pointing device via the changeover means, and for supplying the display position of the cursor to the display means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a table which is useful in explaining a manner of calculating a cursor position by means of cursor positing-calculating means;

DESCRIPTION OF THE PREFERRED EMBODIMENT

First, there will be described an outline of an embodiment of the invention.

Figure 1:
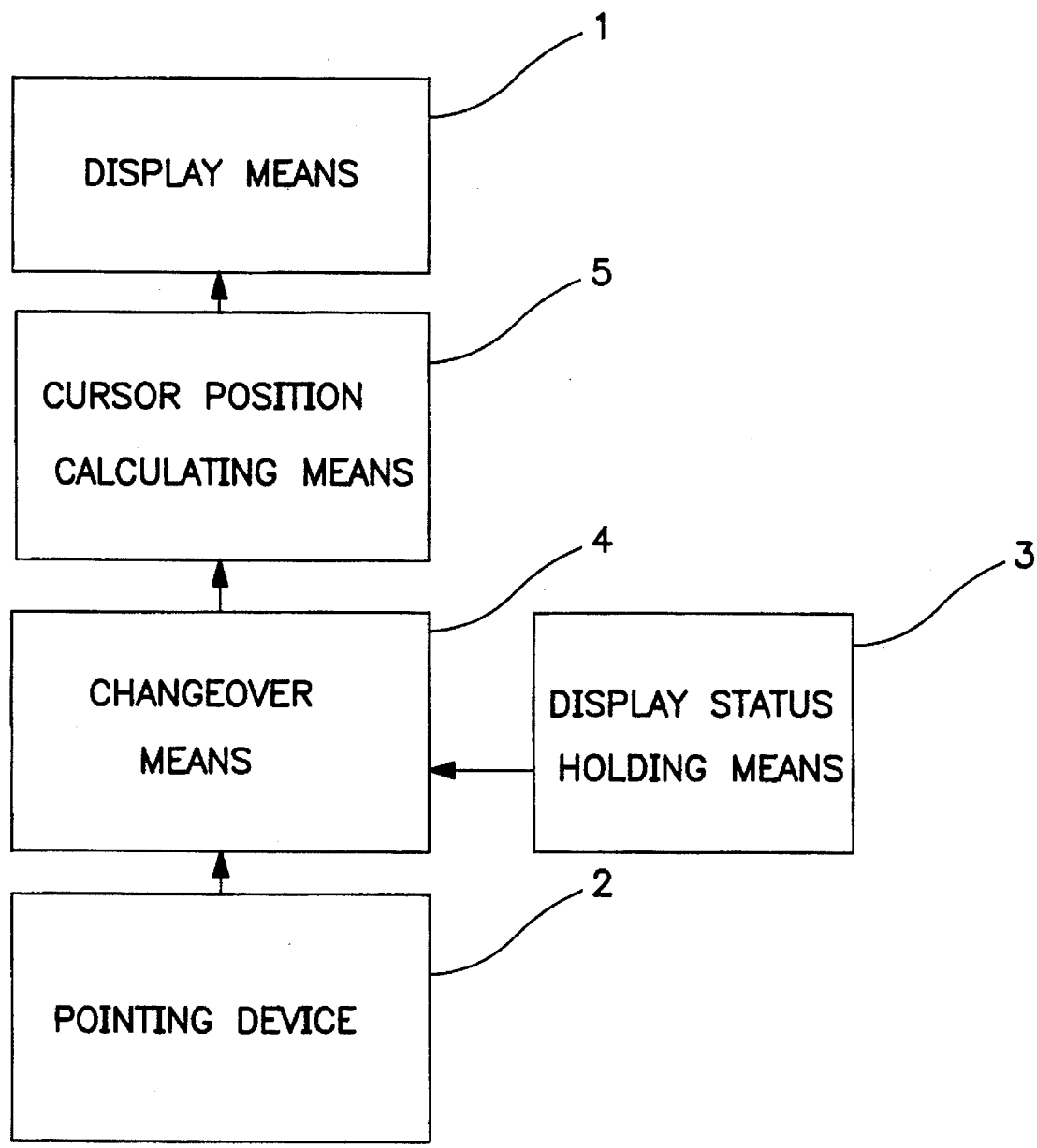
FIG. 1 is a diagrammatic illustrating principles of the invention.

FIG. 1 schematically shows the principle of a cursor display system according to the invention. In the figure, reference numeral 1 designates display means provided with a function of turning a display round through 180 degrees. When an operator normally uses the display means facing toward it, a screen is displayed in a normal state, whereas when the display means is shown to the other party positioned face to face with the operator, the display is displayed in an inverted state in which the display is turned round through 180 degrees. Reference numeral 2 designates a pointing device, such as a mouse, a tablet, cursor keys, and a track ball, while reference numeral 3 designates display status holding means for memorizing whether of display of the display means 1 is in its normal state, or in its diametrically inverted state after a turn through 180 degrees. The display status holding means 3 is connected to changeover means 4 for inverting data of a cursor moving operation from the pointing device 2 in respect of the direction of the operation according to the state of the displayed screen memorized by the display status holding means. Further, cursor position calculating means 5 is provided between the display means 1 and the changeover means 4 for calculating a display position of the cursor on the screen based on the data of the cursor moving operation supplied from the pointing device 2 via the changeover means 4, and for supplying the same to the display means 1.

According to this cursor display system, the display status holding means 3 retain whether the display on the display means 1 is in its normal state or in its diametrically inverted state, and controls the changeover means 4 according to the state of the display. More specifically, if the display is in the normal state, data from the pointing device 2 is supplied to the cursor position calculating means 5 with positive and negative signs attached thereto in a manner correspondent to directions of movement of the pointing device 2, whereas if the display is in the inverted state, the data from the pointing device 2 is supplied to the cursor position calculating means 5 with signs inverted or opposite to those attached when the displayed screen is in the normal state.

Next, the embodiment of the invention will be described in detail.

Figure 2:
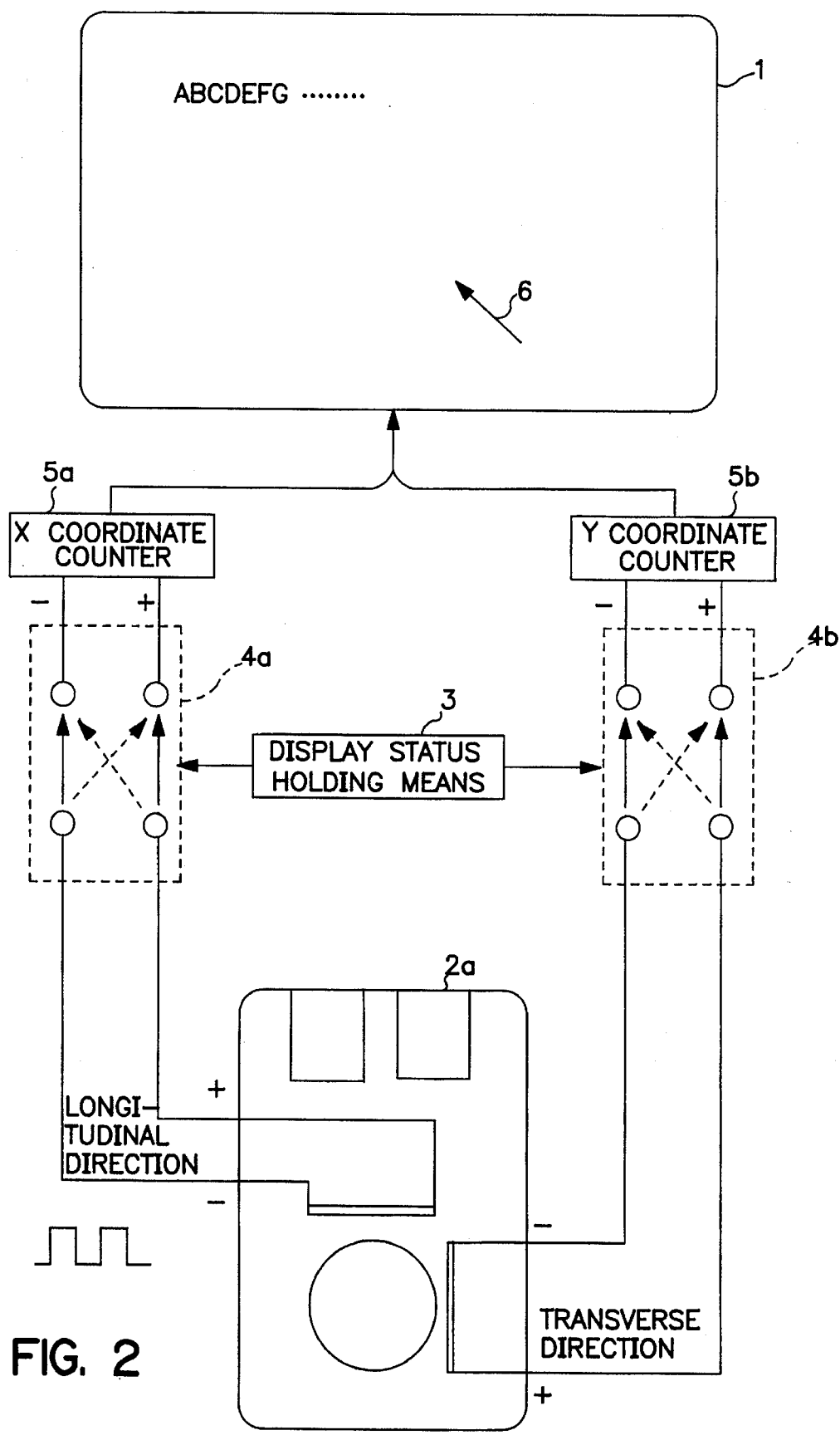
FIG. 2 is a diagram showing the whole arrangement of a cursor display system according to the invention.

FIG. 2 shows the arrangement of the cursor display system according to the embodiment of the invention. Description will be made of a case where a mouse 2a is employed as the pointing device. The mouse 2a is equipped with a device for delivering a number of pulses commensurate with an amount of travel of the mouse 2a in longitudinal directions and a device for delivering a number of pulses commensurate with an amount of travel of the mouse 2a in transverse directions. Outputs from these devices are connected via changeover means 4a and 4b to an X coordinate counter 5a for calculating a cursor position with respect to a longitudinal direction and a Y coordinate counter 5b for calculating a cursor position with respect to a transverse direction to supply each of pulses, respectively. The X coordinate counter 5a and the Y coordinate counter 5b have their outputs connected to the display means 1 so as to display the cursor 6 at calculated X-Y coordinates. Further, the cursor display system 1 has the display status holding means 3 for holding whether the display on the screen is in the normal state or in the inverted state. The display status holding means 3 is connected to the changeover means 4a and 4b to control the same according to the state of the display.

Assuming that the screen is displayed on the display means 1 in the normal state, and this state is held by the display status holding means 3, the changeover means 4a and 4b are in respective positions indicated by solid lines in FIG. 2. In this state, when the mouse 2a is moved rightward, for example, pulses delivered from the mouse 2a are counted by the X coordinate counter 5a to add to the present X coordinate, whereas when the mouse 2b is moved toward the operator, pulses delivered from the mouse 2b are counted by the Y coordinate counter 5b to add to the present Y coordinate. This is based on the fact that the origin of the X-Y coordinate system covering the screen is positioned at an upper left corner of the screen.

Assuming that the screen is displayed on the display means 1 in the inverted state in which the display is turned round through 180 degrees, and this state is automatically or manually held by the display status holding means 3, the changeover means 4a, 4b are switched to positions indicated by the broken lines in FIG. 2. In this state, when the mouse 2a is moved rightward, for example, pulses delivered from the mouse 2a are counted by the X coordinate counter 5a to be subtracted from the present X coordinate, whereas when the mouse 2a is moved toward the operator, pulses delivered from the mouse 2b are counted by the Y coordinate counter 5b to be subtracted from the present Y coordinate point. That is, the position of the cursor in this status of the displayed screen is calculated with signs inverted from those of values counted in the normal display status of the screen.

FIG. 3 shows a manner of calculation of the cursor position by means of cursor position calculating means. An updated position of the cursor resulting from a cursor moving operation by the operator is calculated as shown in FIG. 3 based on the present position which is indicated by the coordinates (x, y). More specifically, to move the mouse 2a upward in the normal display status of the screen, the Y coordinate is decreased by subtraction, whereas in the inverted display status of the screen, the Y coordinate is increased by addition. To move the cursor downward, calculations are made in a manner exactly opposite to the above-described manner of calculations made when the cursor 2a is moved upward. On the other hand, to move the cursor rightward in the normal display status of the screen, the X coordinate is increased by addition, whereas in the inverted display status of the screen, the X coordinate is decreased by subtraction. To move the cursor leftward, calculations are made in a manner exactly opposite to the above-described manner of calculations made when the cursor 2a is moved rightward.

In this connection, it goes without saying that to move the cursor in an oblique direction, the addition or subtraction of the X coordinate value and the addition or subtraction of the Y coordinate value are performed simultaneously.

Figure 4:
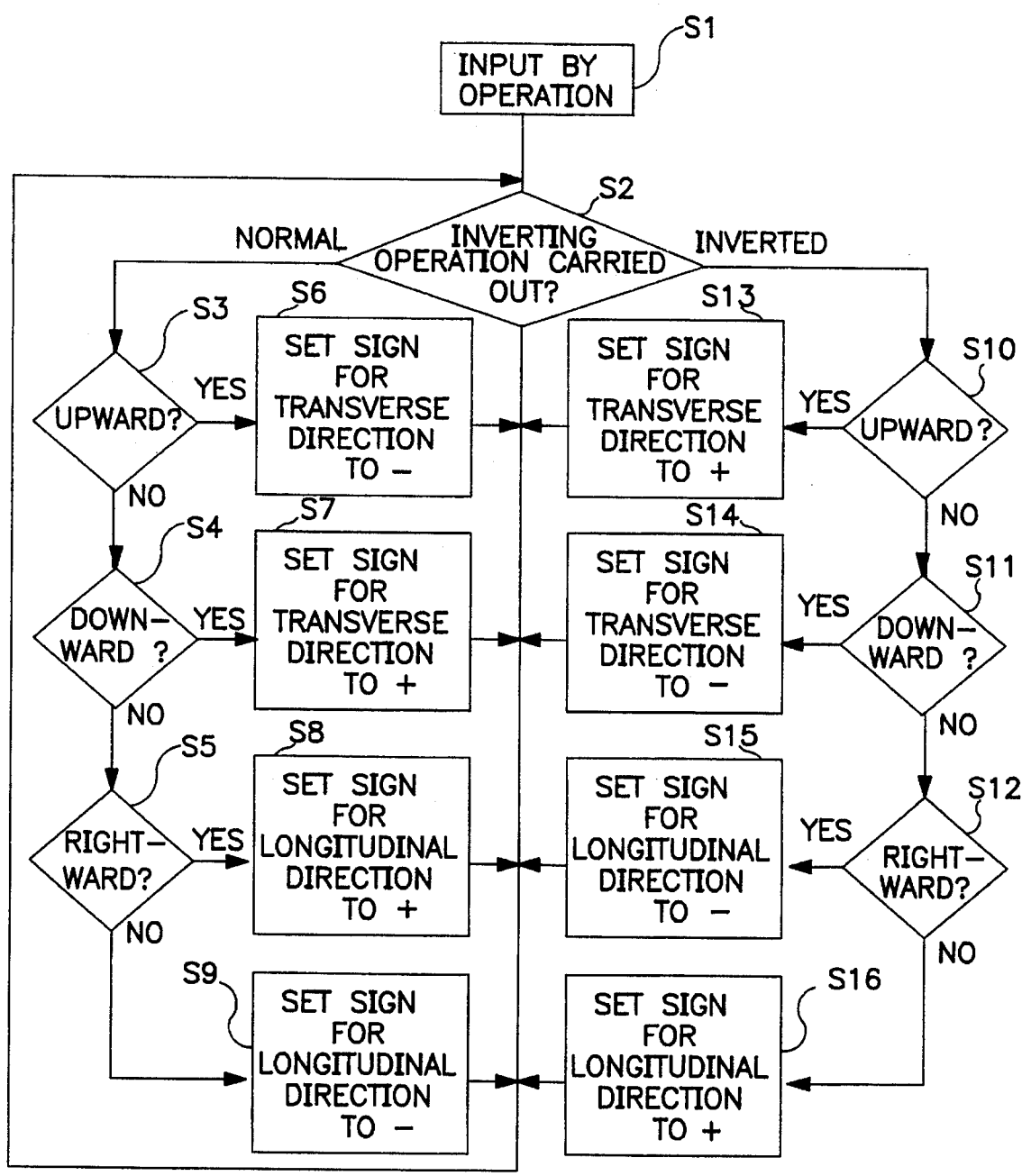
FIG. 4 is a flowchart of a control program for executing processing of cursor moving operations.

FIG. 4 shows a flowchart of a control processing performed in a cursor moving operation. As shown in the figure, when data indicative of the cursor moving operation is input at a step S1, it is first determined at a step S2 whether or not the display on the screen is in the normal state or in the inverted state. If the display is in the normal state, determinations are made on whether the cursor moving operation (i.e. shifting of the pointing device) is directed upward (step S3), or is directed downward (step S4), and whether the cursor moving operation is directed rightward or leftward (step S5). If the cursor moving operation is directed upward, the sign for indicating the direction of a longitudinal movement is set to − (minus) to thereby decrease the Y coordinate value at a step S6, whereas if the cursor moving operation is directed downward, the sign for indicating the direction of the longitudinal movement is set to + (plus) to thereby increase the Y coordinate value at a step S7. If the cursor moving operation is directed rightward, the sign for indicating the direction of a transverse movement is set to + (plus) to thereby increase the X coordinate value at a step S8, whereas if the cursor moving operation is directed leftward, the sign for indicating the direction of the transverse movement is set to − (minus) to thereby decrease the X coordinate value at a step S9.

If the screen is in the inverted state, determinations are also made on whether the cursor moving operation is directed upward (step S10), whether the same is directed downward (step S11), and whether the same is directed rightward or leftward (step S12). If the cursor moving operation is directed upward, the sign for indicating the direction of the longitudinal movement is set to + (plus) to thereby increase the Y coordinate value at a step S13, whereas if the cursor is to be moved downward, the sign for indicating the direction of the longitudinal movement is set to − (minus) to thereby decrease the Y coordinate value at a step S14. If the cursor moving operations is directed rightward, the sign for indicating the direction of the transverse movement is set to − (minus) to thereby decrease the X coordinate value at a step S15, whereas if the cursor moving operation is directed leftward, the sign for indicating the direction of the transverse movement is set to + (plus) to thereby increase the X coordinate value at a step S16.

Although the above control processing for moving the cursor is realized by software, this is not limitative, but the control processing can be realized by hardware. That is, the above control can be carried out by the use of switching means interposed in signal lines for transmitting information on the coordinates to move the cursor in a longitudinal and/or transverse direction. More specifically, signal lines having respective positive and negative polarities for transmitting pulse signals from the pointing device which are indicative of information on the orthogonal coordinates are physically or mechanically changed for connections inverted in respect of polarities, whereby pulses for calculation in inverted signs are supplied to the cursor position calculating means. Therefore, these switching means serve both as the display status holding means and as the changeover means. The switching means may be provided on the pointing device side or on the computer side. In addition, when the switching means is provided on the computer side, it is preferred that the switching means is responsive to a changeover operation for changing the display status of the screen on the display means.

Figure 5:
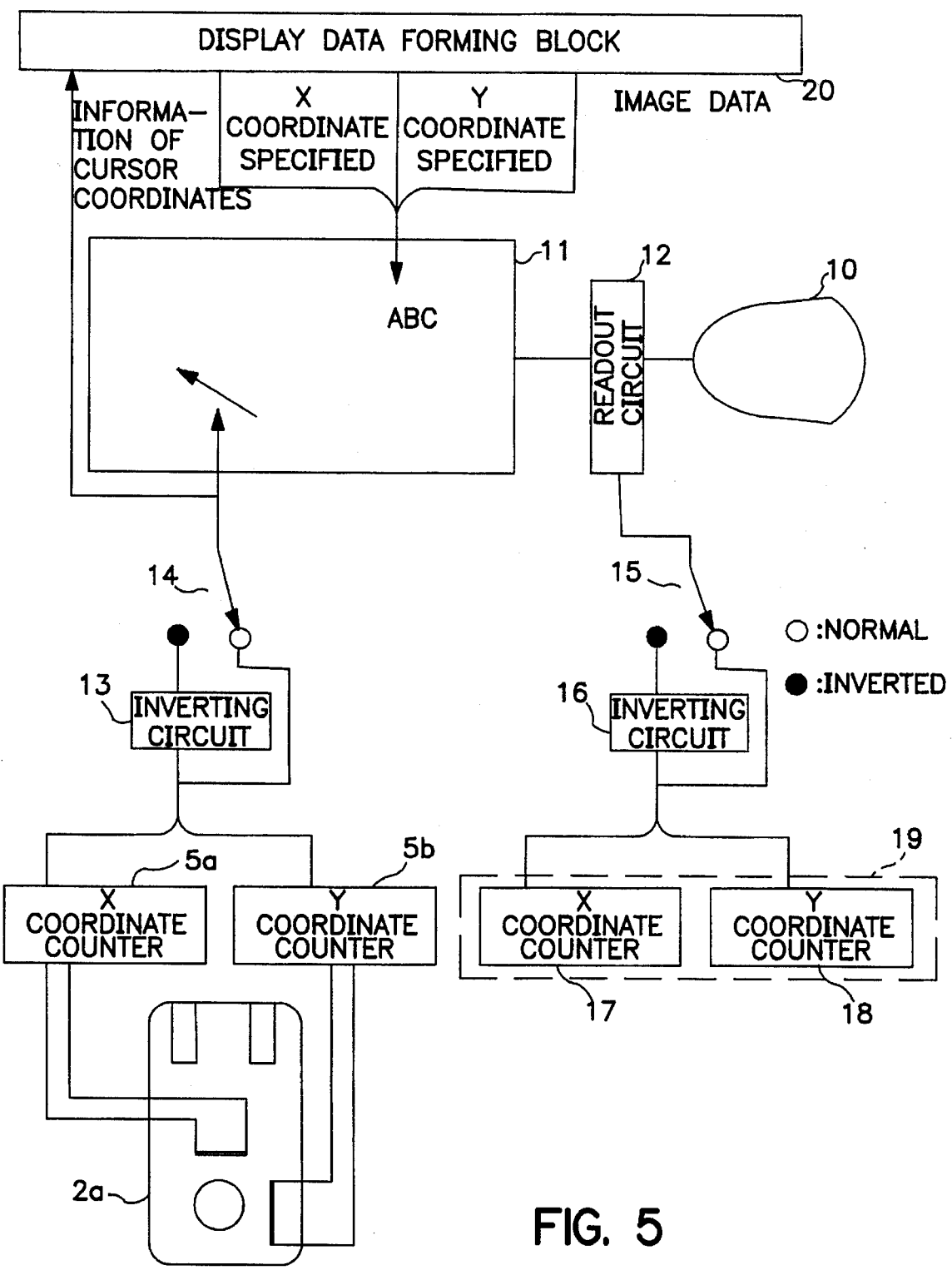
FIG. 5 is a diagram showing an example of a screen display mechanism of the cursor display system of the present invention.

FIG. 5 shows an example of a screen display mechanism of the cursor display system according to the invention. In this example, the screen display mechanism is constructed such that in reading out display data stored in the screen information holding circuit 11 by a readout circuit 12, the display data is inverted in respect of the longitudinal and transverse directions, for display on a display device 10.

In FIG. 5, outputs from the mouse 2a are connected to the X coordinate counter 5a and the Y coordinate counter 5b, and the outputs of these counters 5a and 5b are connected to an inverting circuit 13 and a changeover circuit 14. The inverting circuit 13 has its output connected to the changeover circuit 14, which is changed over between the normal display status and the inverted display status and held at the resulting status. The output of the changeover circuit 14 is connected to the screen information holding circuit 11. The screen information holding circuit 11 is formed by a video RAM (VRAM) in which display data is written. The screen information holding circuit 11 has its output connected via the readout circuit 12 to the display device 10. The readout circuit 12 is connected via a changeover circuit 15 and an inverting circuit 16 to a display control circuit 19 comprised of an X coordinate counter 17 and a Y coordinate counter 18, whereby the readout of the display data from the screen information holding circuit 11 is controlled. Further, the changeover circuit 14 has its output connected to a display data forming block 20. The display data forming block 20 is constructed such that it writes image data into the screen information holding circuit 11 at a location corresponding to coordinates indicated by the mouse 2a based on information on the coordinates of the cursor position.

When the display data is displayed in the normal state on the display device 10, the changeover circuits 14 and 15 are in respective positions shown in the figure, in which the inverting circuits 13 and 16 are bypassed. Therefore, display information of the cursor is written into the screen information holding circuit 11 at a location normally corresponding to the coordinates delivered from the X coordinate counter 5a and the Y coordinate counter 5b. For example, when image data "ABC" is written into the screen information holding circuit 11 at a location corresponding to a coordinate position indicated by the mouse 2a, the display data forming block 20 delivers the X coordinate and the Y coordinate corresponding to the cursor coordinate information from the X coordinate counter 5a and the Y coordinate counter 5b as well as the image data. The image data is written into the screen information holding circuit 11 at a location indicated by these coordinates. The readout circuit 12 normally operates to sequentially read display data stored in the screen information holding circuit 11 in a normal manner under the control of the display control circuit 19 and delivers the same to the display device 10.

When the display data is displayed in the inverted state on the display device 10, the changeover circuits 14 and 15 are changed over to receive outputs from the inverting circuits 13 and 16. The inverting circuits 13 and 16 invert the normal count values of the X coordinate counter and the Y coordinate counter. Now, description will be made, for example, of a case in which the maximum number of dots for display of the display device 10 is 640 × 480. Assuming that the coordinates indicated by the X coordinate counters 5a and 17 and the Y coordinate counters 5b and 18 in the normal display status are (x, y), the inverting circuits 13 and 16 invert the coordinates into (640−x, 480−y). As a result, data of the cursor is written into the screen information holding circuit 11 at a location inverted in respect of coordinates, whereas image data is written therein at a location normal in respect of coordinates. On the other hand, the readout circuit 12 reads data from the screen information holding circuit 11 in a manner inverted in respect of coordinates. As a result, data of the cursor is displayed on the display device 10 in its original normal or non-inverted state, whereas the image data other than the data of the cursor is displayed on the screen in a diametrically inverted state or in a position turned round through 180 degrees.

Figure 6:
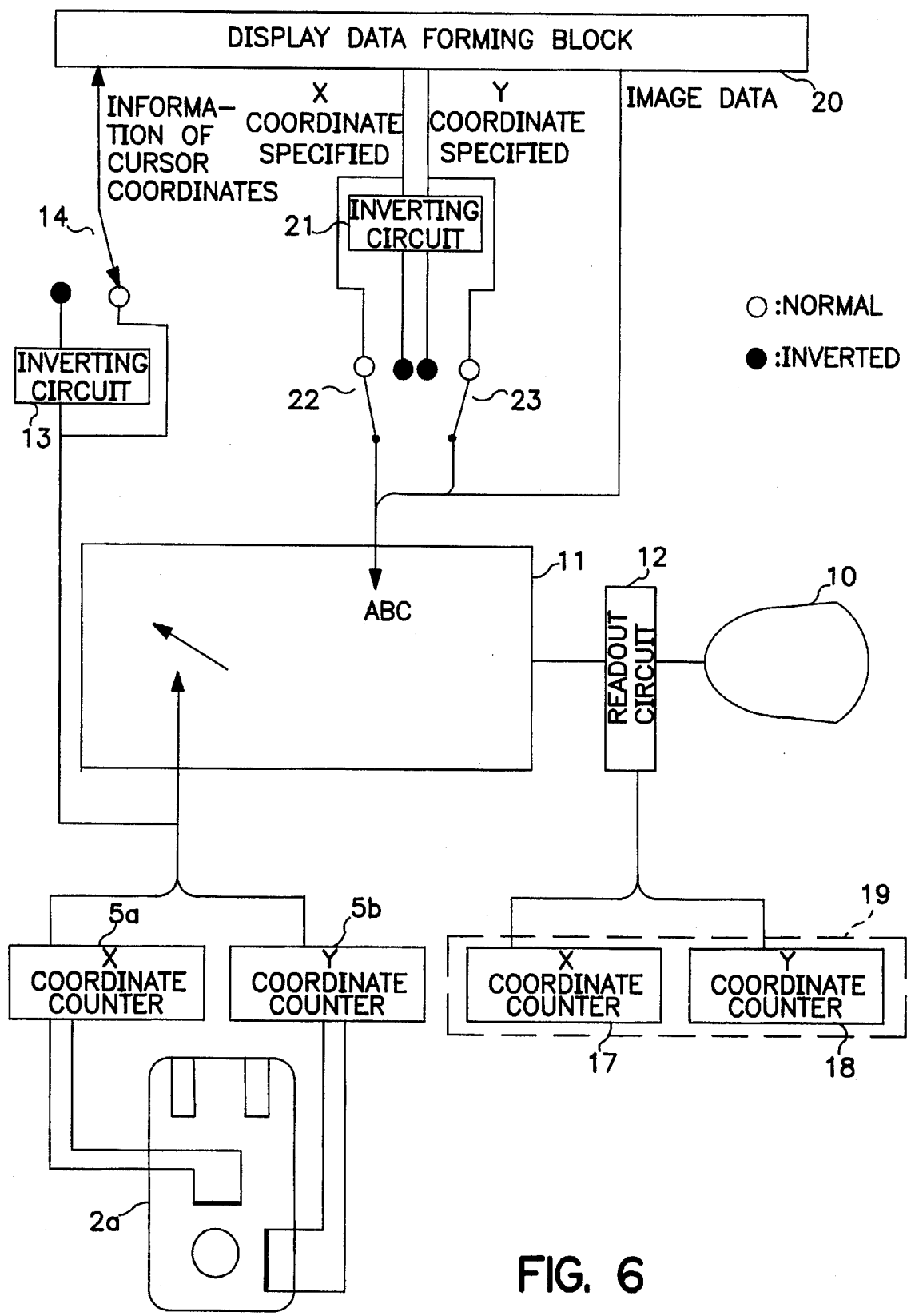
FIG. 6 is a diagram showing another example of a screen display mechanism of the cursor display system of the present invention.

FIG. 6 shows another example of the screen display mechanism of the invention. In this example, the screen display mechanism is constructed such that display data is written into the screen information holding circuit 11 after inverting the data in respect of the longitudinal and transverse directions, and the data stored therein is read out by the readout circuit 12 in a normal or non-inverted manner, for display on the display device 10.

In FIG. 6, outputs form the mouse 2a are connected to the X coordinate counter 5a and the Y coordinate counter 5b, and the outputs of these counters 5a and 5b are connected to the screen information holding circuit 11. The output of the screen information holding circuit 11 is connected via the readout circuit 12 to the display device 10. The readout circuit 12 is connected to the display control circuit 19 comprised of the X coordinate counter 17 and the Y coordinate counter 18, whereby the readout of the display data from the screen information holding circuit 11 is controlled. Further, the outputs of the X coordinate counter 5a and the Y coordinate counter 5b are connected via the inverting circuit 14 and the changeover circuit 13 to the display data forming circuit 20. The display data forming circuit 20 delivers image data and an X coordinate and a Y coordinate indicative of the coordinates of the image data. The X coordinate and the Y coordinate are supplied via an inverting circuit 21 and changeover circuits 22 and 23 to the screen information holding circuit 11. The image data is written into the screen information holding circuit 11 at a location corresponding to these coordinates.

When the display data is displayed in the normal state on the display device 10, the changeover circuits 14, 22 and 23 are in respective positions shown in the figure, in which the inverting circuits 13 and 21 are bypassed. Therefore, display information of the cursor is written into the screen information holding circuit 11 at a location normally corresponding to the coordinates delivered from the X coordinate counter 5a and the Y coordinate counter 5b. For example, when the image data "ABC" is written into the screen information holding circuit 11 at a location corresponding to the coordinates indicated by the mouse 2a, the display data forming block 20 delivers the X coordinate and the Y coordinate corresponding to the cursor coordinate information from the X coordinate counter 5a and the Y coordinate counter 5b as well as the image data. The image data is written into the screen information holding circuit 11 at a location corresponding to these coordinates. The readout circuit 12 normally operates to sequentially read display data stored in the screen information holding circuit 11 in a normal manner under the control of the display control circuit 19 and delivers the same to the display device 10.

When the display data is displayed in the inverted state on the display device 10, the changeover circuits 14, 22, and 23 are changed over to receive outputs from the inverting circuits 13 and 21. As a result, although data of the cursor is written into the screen information holding circuit 11 in a normal state in which coordinates thereof are not inverted, image data is written therein in an inverted state in which coordinates thereof are inverted. On the other hand, the readout circuit 12 reads data from the screen information holding circuit 11 in a normal manner. As a result, data of the cursor is displayed on the display device 10 in its original normal or non-inverted state, whereas the image data is displayed on the display screen in a diametrically inverted state or in a position turned round through 180 degrees.

Figure 7:
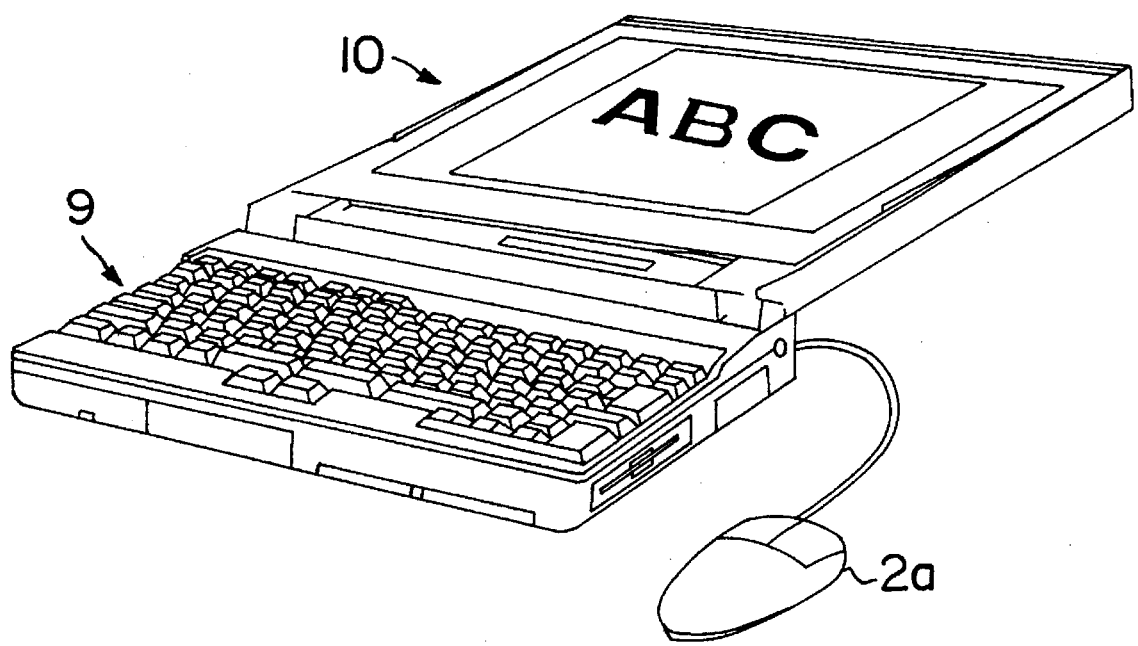
FIG. 7 is a diagram showing an appearance of a notebook-sized personal computer incorporating the cursor display system according to the invention.

FIG. 7 shows an appearance of the notebook-sized personal computer incorporating the cursor display system according to the invention. In this figure, the personal computer is comprised of a body 9 having a processor, a memory device, a keyboard, a display control circuit, and a floppy disc drive unit, etc. and a display device 10 formed e.g. by a liquid crystal display. A mouse 2a as a pointing device is connected to the body 9. The display device 10 is attached to the body 9 by a hinge mechanism such that the display device 10 is folded onto the body 9 when the computer is not used, whereas the display device 10 is opened through a desired angle to be temporarily held thereat when the computer is used. When an operator uses the computer face to face with a customer, the display device 10 is opened through 180 degrees, to thereby permit the display device 10 to be viewed by both the operator and the customer at the same time.

Figure 8:
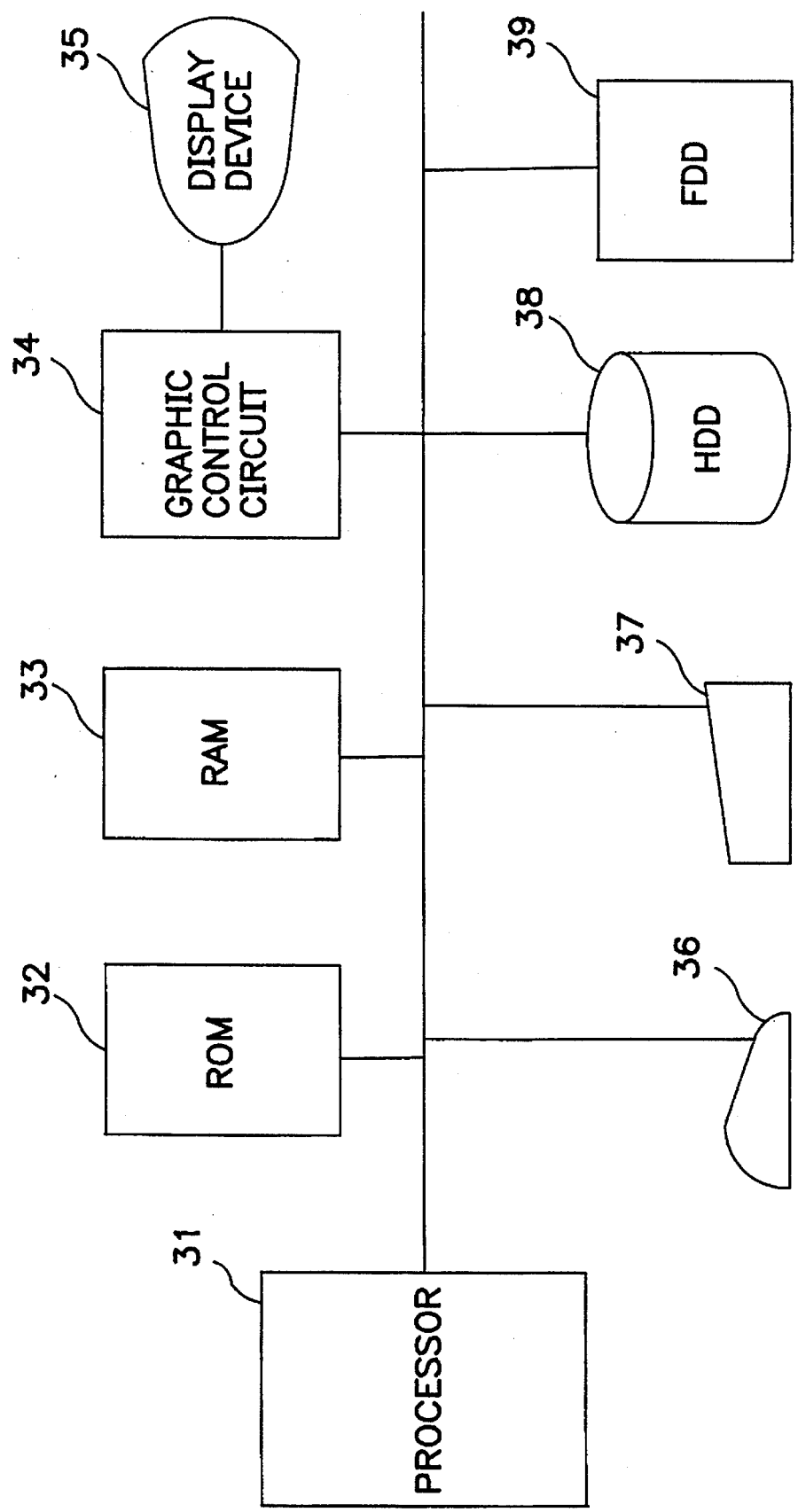
FIG. 8 is a diagram showing an example of hardware which implements the cursor display system according to the invention.

FIG. 8 shows an example of hardware which implements the cursor display system according to the invention. In the figure, the processor 31 controls the overall operation of the personal computer. A read only memory (ROM) 32 stores a boot program, dictionary data, etc. In a main memory device (RAM) 33, not only an application program for electronic presentation is loaded, but also a program resides for displaying a cursor on a screen according to a moving operation of the pointing device.

A graphic control circuit 34 converts screen information generated in the main memory 33 into a display signal, and delivers the same to the display device 35. The display device 35 displays image information of the application program including the cursor on the screen, based on the display signal delivered from the graphic control unit 34.

A mouse 36 is used for moving the cursor displayed on the screen to indicate a figure displayed on the screen and the like for the customer, or to select an item from various kinds of menus displayed on the screen by clicking a button provided thereon. A keyboard 37 is used in inputting characters and numerical values required in operating the screen.

A hard disk device 38 stores application programs for the electronic presentation and various data required therefor. A floppy disk drive unit 39 is used for driving a floppy disk to read therefrom or write therein various kinds of data related to the electronic presentation therein.

As described heretofore, according to the invention, the cursor display system is constructed such that when a display on a screen is in a diametrically inverted state, the movement of a cursor on the screen is made similar or analogous in its direction to that of a pointing device, such as a mouse, operated by the operator. Therefore, there is provided an operating circumstance convenient to the operator in making a face-to-face presentation, with the display on the screen being turned round for the customer to view it. That is, when the operator operates the pointing device in a direction which is intended to move of the cursor displayed on the screen as viewed from the operator, the cursor is moved on the screen in the desired direction. This makes it possible for the operator to use the pointing device as usual without being conscious of an inverted display status in which the screen is turned round.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A cursor display system for displaying a cursor on a display screen of a display device adapted to permit turning of an image on said display screen through 180 degrees, said cursor display system comprising:

display means for turning said image on said display screen through 180 degrees;

a pointing device moveable to control a movement of said cursor appearing on said display screen and transmitting data indicative of operating directions of said pointing device;

display status holding means for storing status data indicating whether said display device is operating in a normal status or in an inverted status in which said display means turns said image through 180 degrees;

changeover means for inverting the data indicative of said operating directions of said pointing device when said status data indicates said inverted status;

cursor position calculating means for calculating a display position of said cursor to be displayed on said display screen of said display device, based on the inverted data from said changeover means; and said display device displaying said cursor on said display screen based on said calculated display position such that said displayed cursor moves on said display screen in the same direction as a direction of movement of said pointing device when said display device operates in said inverted status.

2. A cursor display system according to claim 1, wherein said changeover means inverts signs of the data indicative of said operating directions of said pointing device when said status data indicates said inverted status.

3. A cursor display system according to claim 1, wherein said display status holding means and said changeover means are formed by switching means for inverting information of coordinates supplied from said pointing device with respect to longitudinal directions and transverse directions, and for transmitting said information thus inverted.

* * * * *